United States Patent Office 3,429,923
Patented Feb. 25, 1969

3,429,923
BORON-NITROGEN COMPOUNDS AND PROCESS FOR THE PREPARATION THEREOF
Walter R. Hertler, Wilmington, Del., assignor to E. I. du Pont de Nemours and Company, Wilmington, Del., a corporation of Delaware
No Drawing. Filed June 11, 1965, Ser. No. 463,335
U.S. Cl. 260—570.9         9 Claims
Int. Cl. C07c 87/28, 85/00, 87/04

ABSTRACT OF THE DISCLOSURE

Boron compounds which contain the anion $$RR'NCB_{10}H_{12}^-$$

wherein R and R' are organic groups and the charge is satisfied by quaternization of the nitrogen atom to form an inner salt, or by a cation, can be made by reacting $B_{10}H_{14}$ with an isocyanide and further reacting the product $RNH_2CB_{10}H_{12}$ with an hydroxide or with a hydrocarbylating agent. The compounds can be used to prepare electrical resistors, and as reducing agents in preparing printed electrical circuits.

---

This invention relates to novel boron-containing compounds and to processes for preparing them. More specifically, the invention relates to C-substituted aminododecahydromonocarbaundecarborates and processes for preparing them.

Increased activity in the preparation of novel polyhedral boron compounds has become apparent, and in view of their many properties, the search for new polyhedral boron compounds has continued. It is an object of this invention to provide for novel polyhedral boron compounds containing carbon as a part of the polyhedral framework. It is another object to provide processes for making them. These and other objects will become apparent hereinafter.

The novel compounds of this invention are represented by the formula (1)         $RR'_nM_mNCB_{10}H_{12}$ wherein n is a whole number of 1–2, inclusive (i.e., 1 or 2); m is a whole number of 0–1, inclusive (i.e., 0 or 1); and m+n is equal to 2; R is alkyl, cycloalkyl (including monocyclic and polycyclic cycloalkyl) or aralkyl; R' is hydrogen, alkyl, cycloalkyl, aralkyl, in which the carbon atom bonded to the nitrogen in each of the three groups bears at least one hydrogen (i.e., the R' group is a primary or secondary group), or when n is less than 2, o- or p-nitro-substituted aryl; and M is one equivalent of a cation defined further below. When n is 2, M of course is not present and the two R' groups may be alike or different. Preferably, they are alike.

The nucleus of the compounds of this invention is believed to be a distorted icosahedral fragment consisting of one carbon atom, ten boron atoms and two bridging hydrogen atoms. The substituted amino group is bonded to the carbon atom of the $CB_{10}H_{12}$ nucleus.

The compounds of the invention can be viewed as salts or inner salts in which the anion is $RR'NCB_{10}H_{12}^-$. The valence of the anion can be satisfied by another R' group or by the cation M.

The compounds of the invention can be prepared as described by the following equations:

(1)         $B_{10}H_{14} + RNC \rightarrow RNH_2CB_{10}H_{12}$

The product $RNH_2CB_{10}H_{12}$ can be reacted with a hydroxide of the formula MOH (2)         $RNH_2CB_{10}H_{12} \xrightarrow{MOH} RMNHCB_{10}H_{12}$ or with a hydrocarbylating reagent (3)
$$RNH_2CB_{10}H_{12} \xrightarrow{R''_gZ} RR''NHCB_{10}H_{12} \xrightarrow{R''_gZ} RR''_2NCB_{10}H_{12}$$

Reactions 2 and 3 are interchangeable, for example, $$RR''NHCB_{10}H_{12}$$

can be treated with MOH to obtain $RR''MNCB_{10}H_{12}$; or $RMNHCB_{10}H_{12}$ can be treated with $R''_gZ$ to obtain the same product. It is to be noted that R'' is defined the same as R' above, except that R'' cannot be hydrogen.

In the reaction of Equation 1, decarborane, obtained by well-known procedures, is treated with an isocyanide of the formula RNC where R is as previously defined.

The reaction can take place over a temperature range of about −25° C. to 140° C. in an inert solvent. The solvent may be an aromatic hydrocarbon, such as benzene or toluene; an aliphatic nitrile, such as acetonitrile or propionitrile; an aliphatic or alicyclic hydrocarbon, as for example, heptane, hexane, methylcyclopentane, or cyclohexane; an ether such as dioxane, tetrahydrofuran, or 1,2-dimethoxyethane, or an ester, exemplified by ethyl acetate, ethyl butyrate, 2-ethylhexyl propionate, and the like. Reaction time and pressures are not critical. Atmospheric pressures are generally employed for convenience.

Preferably, a hydrocarbon solvent is used, at a temperature of from about 60–100° C. for a reaction time of about two hours. The ratio of reactants is not critical, e.g., ratios of 10:1 and 1:10 may be employed; but generally an excess of the isocyanide is preferred.

Exemplary isocyanides include methyl isocyanide, ethyl isocyanide, isopropyl isocyanide, isooctyl isocyanide, 3α-cholestanyl isocyanide, and the like.

The products are isolated by conventional methods. In general, they are insoluble in the reaction mixture, and may be isolated by filtration and recrystallization. The products frequently are solvated, e.g., with water or dioxane. The solvating molecules can be removed by heating in vacuo, e.g., at 20–135° C.

The process of the invention used to place R'' groups on the novel compounds (covered by R' in Formula 1) is a hydrocarbylation reaction employing the hydrocarbylating reagent $R''_gZ$, where R'' has been defined previously and Z is a leaving group of valence g. The term "leaving group" is used as described in Gould, "Mechanism and Structure in Organic Chemistry," Holt-Dryden, 1959, p. 261. Preferably, Z is chloride, bromide, iodide, sulfate, or a $C_1$–$C_7$ hydrocarbonsulfonate free of aliphatic unsaturation, i.e., any unsaturation present is aromatic. Thus, examples of $R''_gZ$ include dimethyl sulfate, methyl iodide, benzyl chloride, methyl p-toluenesulfonate, ethyl p-nitrobenzenesulfonate, butyl methanesulfonate, isopropyl butanesulfonate, dodecyl p-toluenesulfonate, and the like. This process is similar to and includes the same reagents and, in general, the same hydrocarbyl groups as are used to hydrocarbylate any organic amine, or hydrochloride thereof, and needs no further amplification. The hydrocarbylation proceeds rapidly at moderate temperatures (15–45° C.) and atmospheric pressures.

The process employed to place the cation M in the compounds of this invention can be carried out with any compound of the formula RR'NHCB$_{10}$H$_{12}$ in the presence of a strong base. In basic solution the anion $$RR'NCB_{10}H_{12}^-$$

forms and the salt RR'MNCB$_{10}$H$_{12}$ can be obtained. The cation M and the strong base can be added together as an equivalent amount of the hydroxide MOH, and the resulting salt obtained by evaporation of the solvent. Alternatively, the boron reactant can be basified and the cation added as MX, where X is an anion that gives a soluble salt in combination with the cation M. Preferably, for convenience, X is halogen.

M in these reactions and in the final M-containing products of this invention can be an alkali metal, alkaline-earth metal, UU'$_3$N$^+$, U$_4$P$^+$, U$_3$S$^+$, U$_4$As$^+$, or U$_4$Sb$^+$, wherein U is aliphatically saturated hydrocarbyl, and U' is aliphatically saturated hydrocarbyl bonded to N through aliphatic carbon. Preferably, U and U' each contain up to 18 carbon atoms and most preferably up to 12 carbons. Any two U or U' groups, or a U and U' in UU'$_3$N$^+$ can also be joined (bonded) to each other directly or through an ethereal oxygen atom to form a divalent aliphatically saturated hydrocarbon group or oxygen-interrupted (mono-oxa) hydrocarbon group of up to 18 carbon atoms and preferably of up to 12 carbons. Most preferably, this divalent group is an alkylene radical of 4–8 carbons. "Aliphatically saturated hydrocarbyl" is defined as a hydrocarbyl group that does not contain any aliphatic unsaturation, i.e., the hydrocarbyl groups can be alkyl, cycloalkyl, aryl, alkaryl or aralkyl.

Examples of the above cations include tetraisopentylammonium, heptyltrimethylammonium, trimethylphenylammonium, cyclododecyltrimethylammonium, tetramethylphosphonium, tetranaphthylphosphonium, ethylpentamethylene - p - tolylphosphonium, dimethyloctadecylsulfonium, methyltetramethylenesulfonium, triethylsulfonium, tetraphenylarsonium, benzylhexadecyldimethylarsonium, dodecyltriethylarsonium, tetramethylstibonium, N, N - didodecylmorpholinium, dibenzyldimethylstibonium, and the like.

Of the above U- and U'-substituted cations, the ammonium, phosphonium and sulfonium are preferred because of availability. For the same reason, those containing only lower alkyl (1–8 carbon atoms) are preferred.

The alkyl, cycloalkyl and aralkyl groups in R and R', both in the final products and in the reactants containing them, are exemplified by methly, isooctyl, isopropyl, 2-ethylhexyl, 1-methylnonyl, octadecyl, 3α-cholestanyl (R only), adamantyl (R only), cyclobutyl, methylcyclopentyl, decahydronaphthyl, benzyl, 1-phenylethyl, p-butyltolyl, p-phenylphenethyl, 4-pyrenylmethyl, and the like. The carbon atom content is not critical. However, the alkyl groups are preferably of up to 18 carbon atoms, because of availability, and most preferably of up to 8 carbons. The cycloalkyl groups of R and R' (and consequently, of R'') include alkylcycloalkyl and cycloalkylalkyl groups. Preferably the R cycloalkyl groups contain from 4 to 30 carbon atoms; while the R' cycloalkyl groups contain 4 to 18 carbon atoms and most preferably 4–8. The aralkyl groups include alkaralkyl and preferably contain from 7–18 carbon atoms.

The o- or p-nitro-substituted aryl groups of R' are preferably of 6–12 carbon atoms and are exemplified by o-nitrophenyl, p-nitrophenyl, 1-(2-nitronaphthyl), 2-(5-nitrobiphenylyl), and the like.

In general, the compounds of the invention are white, crystalline, high-melting solids which are stable to air, moisture and dilute acids and bases.

The products and processes of the invention are illustrated in further detail in the following examples.

EXAMPLE 1

A mixture of 10 g. of decaborane, 13.5 g. of n-butyl isocyanide, and 150 ml. of benzene was refluxed for 2 hours, and then evaporated in vacuo. The residue was washed with pentane and then extracted with dilute aqueous sodium hydroxide. The extract was acidified with hydrochloric acid, and the resulting precipitate was collected by filtration to give 0.82 g. of n-C$_4$H$_9$NH$_2$CB$_{10}$H$_{12}$. Recrystallization from benzene-methanol produced needles, M.P. 209–210° C.

*Analysis.*—Calcd. for C$_5$H$_{23}$B$_{10}$N: B, 52.6; H, 11.3; C, 29.2; N, 6.83. Found: B, 54.8; H, 11.3; C, 29.6; N, 7.03.

EXAMPLE 2

A mixture of 2.44 g. of decaborane, 2.34 g. of benzyl isocyanide, and 50 ml. of benzene was refluxed for 2 hours. The mixture was evaporated in vacuo, and the residue was suspended in pentane and filtered. The filter cake was extracted with dilute aqueous sodium hydroxide and filtered. The filtrate was acidified with hydrochloric acid. The resulting precipitate was collected by filtration to give 1.02 g. of C$_6$H$_5$CH$_2$NH$_2$CB$_{10}$H$_{12}$. Recrystallization from benzene-cyclohexane followed by recrystallization from benzene-methanol gave crystals with M.P. 180.5–181° C.

*Analysis.*—Calcd. for C$_8$H$_{21}$B$_{10}$N: B, 45.2; H, 8.84; C, 40.1; N, 5.86. Found: B, 45.3; H, 8.73; C, 39.9; N, 5.75.

The product readily forms a crystalline 1:1 solvate with benzene from which the benzene can be removed by heating in vacuo.

Platinum-catalyzed acid hydrolysis of a similar sample of the product gave 1859.2 ml. of hydrogen per gram of compound which corresponds to 19.9 moles of H$_2$ per mole of compound of molecular weight 239.5. This is consistent with the equation:

$$C_6H_5CH_2NH_2CB_{10}H_{12}+30H_2O \rightarrow 20H_2 +C_6H_5CH_2NHCH_3+10B(OH)_3$$

and confirms the presence of 12 hydrogens on the CB$_{10}$ nucleus.

EXAMPLE 3

A mixture of 4.9 g. of decaborone, 120 ml. of benzene, and 9 g. of cyclohexyl isocyanide was heated to reflux, and 4 drops of acetonitrile was added. After two hours refluxing, the mixture was cooled, and the precipitated solid collected by filtration. The crude product was extracted with dilute aqueous sodium hydroxide solution and filtered. The filtrate was acidified with hydrochloric acid whereupon a colorless precipitate appeared and was collected by filtration. Recrystallization from benzene containing a little ethanol gave 1.4 g. of C$_6$H$_{11}$NH$_2$CB$_{10}$H$_{12}$, M.P. 264.5–266.5° C.

*Analysis.*—Calcd. for C$_7$H$_{25}$B$_{10}$N: B, 46.7; H, 10.9; C, 36.4; N, 6.06. Found: B, 47.7; H, 11.0; C, 36.9; N, 6.10.

Platinum-catalyzed acid hydrolysis gave 1940.0 cc. of H$_2$ per gram of compound which corresponds to 20 moles of H$_2$ per formula wt. 231.5 in accord with the equation $$C_6H_{11}NH_2CB_{10}H_{12}+30H_2O \rightarrow 20H_2 +C_6H_{11}NHCH_3+10B(OH)_3$$

This confirms the presence of 12 hydrogens on the CB$_{10}$ nucleus.

When a similar sample of C$_6$H$_{11}$NH$_2$CB$_{10}$H$_{12}$ was dissolved in alkaline D$_2$O and then precipitated with acid, the infrared spectrum of the product showed no B-D absorption; however, the absorption characteristic of NH$_2$ stretch and NH$_2$ deformation had disappeared, and new peaks characteristic of ND$_2$ stretch and deformation had appeared. This confirms the presence of two hydrogens on the nitrogen atom.

EXAMPLE 4

A mixture of 2.44 g. of decaborane, 3.32 g. of tert-butyl isocyanide, and 60 ml. of benzene was stirred at reflux for 2 hours. The mixture was cooled and filtered to give a solid material. The filtrate was treated with pentane which caused precipitation of additional solid matreial. The combined solids were extracted with dilute aqueous sodium hydroxide solution and the mixture was filtered. The filtrate was acidified with hydrochloric acid and the resulting precipitate collected by filtration to give 1.07 g. of $(CH_3)_3CNH_2CB_{10}H_{12}$. Recrystallization from benzene-ethanol gave pale yellow plates, M.P. 233–234° C.

*Analysis.*—Calcd. for $C_5H_{23}B_{10}N$: B, 52.6; H, 11.3; C, 29.2; N, 6.8. Found: B, 52.1; H, 11.5; C, 29.9; N, 7.1.

The $H^1$ nuclear-magnetic-resonance (n-m-r) spectrum of the product in acetone-$d_6$ shows a single peak at 8.89$\tau$ corresponding to the tert-butyl group. No other peaks were detected.

The mass spectrum of a similar sample (solid injection) showed a peak at 207 as the highest significant peak corresponding to $C_5H_{23}B_{10}N$ of all $B^{11}$ isotope.

EXAMPLE 5

1-isocyanoadamantane was prepared in the following manner: To a solution of 9.17 g. of 1-formamidoadamantane in 31 ml. of pyridine and 16 ml. of petroleum ether was added 4.7 g. of phosphorus oxychloride, whereupon a vigorous reaction ensued. The resulting mixture was refluxed for 15 minutes and then treated with ice water and filtered to give 5.02 g. of 1-isocyanoadamantane as a pale tan solid. An additional crop of 3.5 g. was obtained by evaporation of the organic phase of the filtrate. Recrystallization from heptane gave crystals of 1-isocyanoadamantane, M.P. 190–191° C.

*Analysis.*—Calcd. for $C_{11}H_{15}N$: C, 81.9; H, 9.4; N, 8.7. Found: C, 82.0; H, 9.5; N, 8.7.

The infrared absorption spectrum of the product showed an intense peak near 2100 cm.$^{-1}$ characteristic of the isocyano group.

A mixture of 5 g. of 1-isocyanoadamantane, 5 g. of decaborane and 75 ml. of benzene was stirred at reflux for 1 hour. The mixture was cooled and filtered to give 3.5 g. of crude 1-$C_{10}H_{15}NH_2CB_{10}H_{12}$ as a tan solid. Recrystallization of the product from benzene-cyclohexane gave 1.78 g. of pure 1-$C_{10}H_{15}$-$NH_2CB_{10}H_{12}$ which darkens but does not melt to 500° C.

*Analysis.*—Calcd. for $C_{11}H_{29}B_{10}N$: B, 38.2; H, 10.3; C, 46.6; N, 4.94. Found: B, 38.8; H, 10.5; C, 48.9; N, 4.99.

The infrared spectrum of the product shows absorption at 3150 and 1560 cm.$^{-1}$ characteristic respectively of —$NH_2$ stretch and —$NH_2$ deformation, consistent with the proposed structure.

EXAMPLE 6

To a warm stirred solution of 0.175 g. of $C_6H_{11}NH_2CB_{10}H_{12}$ in 5% aqueous sodium hydroxide was added dropwise dimethyl sulfate. A precipitate soon formed and was collected by filtration to give 0.195 g. of $C_6H_{11}N(CH_3)_2CB_{10}H_{12}$ as a white solid. Recrystallization from benzene-ethanol-cyclohexane gave crystals of M.P. 255–257° C.

*Analysis.*—Calcd. for $C_9H_{29}B_{10}N$: B, 41.8; H, 11.3; C, 41.6; N, 5.4. Found: B, 41.7; H, 11.3; C, 42.1; N, 5.4.

Example 7

To a solution of 1 g. of $(CH_3)_3CNH_2CB_{10}H_{12}$ in dilute aqueous sodium hydroxide was added portionwise excess dimethyl sulfate. A gum separated which solidified on scratching. Filtration gave 1 g. of $(CH_3)_3CN(CH_3)_2CB_{10}H_{12}$ as a yellow solid. The product was purified by recrystallization from benzene-cyclohexane to give colorless crystals, M.P. 157–159° C.

*Analysis.*—Calcd. for $C_7H_{27}B_{10}N$: B, 46.4; H, 11.7; C, 36.0; N, 6.0. Found: B, 46.9; H, 11.6; C, 35.3; N, 6.4.

Example 8

To a filtered solution of 0.5 g. of $(CH_3)_3CNH_2CB_{10}H_{12}$ in dilute aqueous sodium hydroxide solution was added an excess of tetramethylammonium chloride. The resulting precipitate was collected by filtration and recrystallized from aqueous ethanol containing a little tetramethylammonium hydroxide to give 0.31 g. of $(CH_3)_4N^+(CH_3)_3CNHCB_{10}H_{12}^-$ as plates, M.P. 203–208° C.

*Analysis.*—Calcd. for $C_9H_{34}B_{10}N_2$: B, 38.8; H, 12.3; C, 38.8; N, 10.1. Found: B, 38.5; H, 12.1; C, 38.7; N, 10.1.

The $H^1$ n-m-r spectrum of the product in acetonitile-$d_3$ showed two peaks at 7.18$\tau$ (tetramethylammonium, relative intensity 4) and 9.18$\tau$ (tert-butyl, relative intensity 3). No other peaks were observed.

Example 9

To a solution of 0.5 g. of $C_6H_{11}NH_2CB_{10}H_{12}$ in dilute aqueous sodium hydroxide was added tetramethylammonium chloride. The resulting precipitate was collected by filtration to give 0.46 g. of $(CH_3)_4N^+C_6H_{11}NHCB_{10}H_{12}^-$ as a white solid. Recrystallization from aqueous ethanol gave crystals with M.P. 216–219° C.

*Analysis.*—Calcd. for $C_{11}H_{36}B_{10}N_2$: B, 35.5; H, 11.9; C, 43.4; N, 9.19. Found: B, 37.3; H, 11.8; C, 42.5; N, 8.71.

Example 10

To a solution of 0.2 g. of $C_6H_5CH_2NH_2CB_{10}H_{12}$ in dilute aqueous sodium hydroxide solution was added excess aqueous rubidium chloride. The resulting precipitate was collected by filtration and recrystallized from aqueous sodium hydroxide containing rubidium chloride to give crystals of $RbC_6H_5CH_2NHCB_{10}H_{12} \cdot H_2O$.

*Analysis.*—Calcd. for $C_8H_{22}B_{10}NORb$: B, 31.6; H, 6.5; C, 28.1. Found: B, 31.8; H, 6.4; C, 27.3.

The foregoing examples are merely illustrative, for any of the R, R' and M groups described hereinabove may be placed on the $NCB_{10}H_{12}$ nucleus by the procedures described in the examples.

The compounds of the invention are useful as reducing agents. For example, they reduce silver nitrate to metallic silver.

They are also useful as intermediates in the preparation of other boron cage compounds. For example, 0.82 g. of $(CH_3)_3CNH_2CB_{10}H_{12}$, 30 ml. of di(2-methoxyethyl) ether and 0.3 g. of sodium borohydride was refluxed for 2 hours. The mixture was evaporated in vacuo, and the residue treated with water and filtered. The filtrate was acidified with hydrochloric acid, and the resulting precipitate collected by filtration to give 0.84 g. of solid $(CH_3)_3CNH_2CB_{11}H_{11}$ as a complex with di(2-methoxyethyl)ether. The complex was dissolved in dilute sodium hydroxide solution and treated with tetramethylammonium chloride to give a precipitate of $(CH_3)_4N^+(CH_3)_3CNHCB_{11}H_{11}^-$, which was collected by filtration and recrystallized from aqueous ethanol containing tetramethylammonium hydroxide. The resulting plates melted at 345–349° C. with concomitant bubbling.

*Analysis.*—Calcd. for $C_9H_{33}B_{11}N_2$: B, 41.3; H, 11.5; C, 37.5; N, 9.71. Found: B, 41.0; H, 12.0; C, 37.3; N, 9.77.

The compounds of the invention are also useful in the preparation of electrical resistors. A cotton string can be impregnated with a nearly saturated solution of a compound of the invention, e.g., $(CH_3)_3CNH_2CB_{10}H_{12}$, in a volatile solvent such as acetonitrile. When the string is removed, dried and burned, a coherent ash is left which resembles the original string in size and shape. This ash is sufficiently coherent to permit embedding in paraffin for use as an electrical resistor. Resistors of up to 4200 ohms/mm. have been prepared in this fashion.

The novel compounds can be employed as reducing agents in preparing printed electrical circuitry. A circuit can be traced on paper using a solution of acetonitrile and one of the compounds of this invention. After evaporating the solvent, the tracings can be sprayed with an aqueous solution of palladium chloride. After rinsing, a metallic tracing of reduced palladium is left.

As many apparently widely different embodiments of this invention may be made without departing from the spirit and scope thereof, it is to be understood that this invention is not limited to the specific embodiments thereof except as defined in the appended claims.

The embodiments of this invention in which the exclusive property or privilege is claimed are defined as follows:

1. A compound of the formula $RR'_2NCB_{10}H_{12}$ wherein R is selected from the group consisting of alkyl up to 18 carbons, cycloalkyl of from 4–30 carbons and aralkyl of from 7–18 carbon atoms; R' is selected from the group consisting of hydrogen, alkyl of up to 18 carbons, cycloalkyl of from 4–18 carbon atoms, aralkyl of from 7–18 carbon atoms, wherein said alkyl, cycloalkyl and aralkyl groups are bonded to the nitrogen atom through a carbon bearing at least one hydrogen.
2. A compound of claim 1 wherein R' is hydrogen.
3. $n\text{-}C_4H_9NH_2CB_{10}H_{12}$.
4. $C_6H_5CH_2NH_2CB_{10}H_{12}$.
5. $1\text{-}C_{10}H_{15}NH_2CB_{10}H_{12}$.
6. $(CH_3)_3CN(CH_3)_2CB_{10}H_{12}$.
7. $C_6H_{11}N(CH_3)_2CB_{10}H_{12}$.
8. A process for preparing boron compounds which comprises reacting $RNH_2CB_{10}H_{12}$, wherein R is selected from the group consisting of alkyl of up to 18 carbon atoms, cycloalkyl of from 4–30 carbon atoms, and aralkyl of from 7–18 carbon atoms, with a composition selected from the group consisting of $R''_gZ$, wherein R'' is selected from the group consisting of alkyl of up to 18 carbon atoms, cycloalkyl of from 4–18 carbon atoms, aralkyl of from 7–18 carbon atoms, o-nitroaryl, p-nitroaryl, o- and p-nitroaryl, said aryl groups having 6–12 carbon atoms, and wherein said alkyl, cycloalkyl and aralkyl groups are bonded to the nitrogen atom through a carbon bearing at least one hydrogen; Z is the leaving group of hydrocarbylating reagent $R''_gZ$; and $g$ is the valence of Z.
9. A process for preparing boron compounds which comprises reacting decaborane with an isocyanide of the formula RNC, wherein R is selected from the group consisting of alkyl of up to 18 carbon atoms, cycloalkyl of from 4–30 carbon atoms, and aralkyl of from 7–18 carbon atoms, in an inert solvent at a temperature between −25° C. and 140° C.

References Cited

UNITED STATES PATENTS 3,203,995  8/1965  Green et al. _____ 260—583

CHARLES B. PARKER, *Primary Examiner.*

R. L. RAYMOND, *Assistant Examiner.*

U.S. Cl. X.R.

75—145; 260—440, 453, 466, 563, 567.6, 583